United States Patent
Park

(10) Patent No.: US 7,635,158 B2
(45) Date of Patent: Dec. 22, 2009

(54) UPPER BODY STRUCTURE FOR FUEL CELL VEHICLE FOR REINFORCING FLOOR KICK-UP PORTION

(75) Inventor: Tae Wan Park, Seoul (KR)

(73) Assignees: Hyundai Motor Company, Seoul (KR); Kia Motors Company, Seoul (KR)

(*) Notice: Subject to any disclaimer, the term of this patent is extended or adjusted under 35 U.S.C. 154(b) by 27 days.

(21) Appl. No.: 12/001,610

(22) Filed: Dec. 11, 2007

(65) Prior Publication Data

US 2009/0058142 A1    Mar. 5, 2009

(30) Foreign Application Priority Data

Sep. 3, 2007    (KR) .................. 10-2007-0088769

(51) Int. Cl.
    *B62D 25/20*    (2006.01)
(52) U.S. Cl. ..................... 296/203.04; 296/193.07
(58) Field of Classification Search ............ 296/193.07, 296/203.04, 204; 280/783, 784
    See application file for complete search history.

(56) References Cited

U.S. PATENT DOCUMENTS

| | | | | |
|---|---|---|---|---|
| 2,662,793 A | * | 12/1953 | Lindsay ................ | 296/193.07 |
| 3,590,936 A | * | 7/1971 | Wessells et al. ............ | 180/312 |
| 3,661,419 A | * | 5/1972 | Mitamura et al. ...... | 296/203.04 |
| 4,729,156 A | * | 3/1988 | Norris et al. ............... | 29/401.1 |
| 4,950,026 A | * | 8/1990 | Emmons ................ | 296/203.01 |
| 6,443,518 B1 | * | 9/2002 | Rohl et al. ............ | 296/203.01 |
| 2003/0030303 A1 | * | 2/2003 | Panoz ......................... | 296/204 |
| 2006/0238000 A1 | * | 10/2006 | Tohda et al. ................ | 296/204 |

FOREIGN PATENT DOCUMENTS

| | | |
|---|---|---|
| JP | 2003-127907 | 5/2003 |
| JP | 2003-291857 | 10/2003 |
| JP | 2004-042828 | 2/2004 |
| JP | 2005-079002 | 3/2005 |

* cited by examiner

*Primary Examiner*—Dennis H Pedder
(74) *Attorney, Agent, or Firm*—Edwards Angell Palmer & Dodge LLP; Peter F. Corless

(57) ABSTRACT

An upper body structure for a fuel cell vehicle for reinforcing a floor kick-up portion is disclosed. The upper body structure for the fuel cell vehicle includes: a center floor rear cross member (114) horizontally arranged in a lower portion of the floor kick-up portion and connecting side sills (111) arranged on both sides of the upper body; two rear floor front side members (123) arranged in an up-down direction on both sides of the upper body and having lower ends connected to both ends of the center floor rear cross member (114); and a rear floor front cross member (124) horizontally arranged in an upper portion of the floor kick-up portion and connecting upper ends of the two rear floor front side members (123), wherein the center floor rear cross member (114), the two rear floor front side members (123) and the rear floor front side member (124) form a first ring-type structure.

1 Claim, 5 Drawing Sheets

UPPER BODY STRUCTURE FOR FUEL CELL VEHICLE FOR REINFORCING FLOOR KICK-UP PORTION

CROSS-REFERENCE TO RELATED APPLICATION

This application claims the benefit under 35 U.S.C. §119(a) on Korean Patent Application No. 10-2007-88769, filed on Sep. 3, 2007, the entire contents of which are incorporated herein by reference.

BACKGROUND

1. Technical Field

The present invention relates to a vehicle body structure for a fuel cell vehicle, and more particularly, to a vehicle body of a fuel cell vehicle including a lower vehicle body structure of an upper body for reinforcing a floor kick-up portion.

2. Background Art

Vehicle industry has rapidly grown centering on gasoline and diesel internal combustion engines for more than one hundred years, but it is now confronted by a tremendous change due to problems such as environmental regulations, threat to energy security and exhaustion of fossil fuel.

Many developed countries have entered into competition of developing future vehicles with environment-friendly, high efficient and high-tech features, and major vehicle companies are trying to survive in such keen competition.

In accordance with the demand of the times for environment-friendly products which can resolve a fossil fuel exhaustion problem, vehicle companies have been actively developing electric vehicles which use an electric motor as a power source.

In this connection, research on a vehicle with a fuel cell system mounted thereon has been actively undergone.

As well known, a vehicle with a fuel cell system supplies hydrogen to a fuel cell stack as fuel to generate electric energy which is used to operate an electric motor to drive a vehicle.

Here, a fuel cell system is a sort of a power generating system which does not change chemical energy in fuel to heat by combustion but electrochemically generates electric energy therein.

A fuel cell system comprises a fuel cell stack for generating electric energy, a fuel supplying system for supplying fuel (hydrogen) to the fuel cell stack, an air supplying system for supplying oxygen in the air as an oxidizer used in an electrochemical reaction, and a heat/water management system for externally discharging reaction heat of the fuel cell stack and controlling a driving temperature of the fuel cell stack.

In such a fuel cell system, electric energy is generated by an electrochemical reaction of hydrogen as fuel and oxygen in the air, generating heat and water as a reaction byproduct.

As a fuel cell system, a proton exchange membrane fuel cell (PEMFC) is widely used due to high output density.

Meanwhile, a conventional fuel vehicle has a vehicle body of a box-type structure called "a monocoque body" which does not have a frame.

The monocoque body is configured by a combination of thin panels and reinforcing members to provide an engine room, a passenger room and a trunk room and is designed to distribute an external force caused in the event of a vehicle crash to the whole body.

In the conventional vehicle body structure, a humidifier for humidifying air supplied to a fuel cell stack, the fuel cell stack for generating electric energy by an electrochemical reaction between hydrogen as fuel and oxygen in the air, and a fuel processing system for controlling pressure of hydrogen supplied from a hydrogen tank to supply hydrogen as fuel are mounted in an engine room of a monocoque body, whereas a plurality of hydrogen tanks are mounted below a rear floor of a monocoque body.

The humidifier and the fuel cell stack mounted in a fuel cell vehicle are very heavy in weight.

If these heavy parts are mounted in the engine room of the monocoque body, a monocoque body configured by combining very thin panels which are mold-manufactured may not endure the strength and, so the monocoque body may become very weak in durability for enduring an external force. That is, providing the monocoque body with sufficient strength requires its structure to be more complicated.

In order to resolve the above problems, as shown in FIG. 1, a vehicle body structure which comprises an upper body 100 and a chassis frame 200 as a dedicated platform for a fuel cell vehicle has been suggested.

The upper body 100 is configured by combining thin panels and reinforcing members to provide an engine room, a passenger room, and a trunk room. The upper body 100 comprises a roof 101, a filler 102, a fender 103, a hood 104, a trunk lid (not shown), a dash panel (not shown), a center floor 105, and a rear floor 106 which are made by molding thin panels, like the monocoque body of an internal combustion engine.

The chassis frame 200 comprises a plurality of longitudinal members and a plurality of transverse members. The chassis frame 200 includes two side members 210 as longitudinal members. It also includes a plurality of cross members 222 and 223 as transverse members, which are arranged between the side members 210 and bumper reinforcing members 231 and 232.

That is, the chassis frame 200 for forming a lower portion of the vehicle body is arranged to apply a frame body of the fuel cell vehicle and forms a vehicle body of the fuel cell vehicle together with the upper body 100. In the chassis frame 200, main fuel cell system parts such as a humidifier 11, a fuel cell stack 12, a FPS 13, and a hydrogen tank 14 are mounted.

The chassis frame 200 is provided with a plurality of body mounting portions 217a to 217d. The upper body 100 is to be coupled to the chassis frame 200 through the body mounting portions 217a to 217d.

Referring to FIG. 1, provided are eight body mounting portions 217a to 217d for mounting the upper body onto the chassis frame 200. The body mounting portions 217a to 217d of the chassis frame 200 are located at positions where corresponding portions of the bottom of the upper body 100 exist. The upper body 100 is coupled to the chassis frame 200 at the eight positions.

Since the upper body 100 is coupled to the chassis frame 200 only through the body mounting portions 217a to 217d, the body mounting portions 217a to 217d of the chassis frame 200 serve to transfer load applied to the upper body 100.

Meanwhile, hydrogen which is fuel of a fuel cell vehicle is stored in a hydrogen tank 14 in a gas state, and two or three hydrogen tanks are installed before or after a rear suspension.

Since hydrogen is stored in a gas state, the size of each hydrogen tank is increased, which interferes with setting a ground clearance and securing a passenger room.

As shown in FIG. 2, a floor kick-up portion 107 must exist at a connection portion between the center floor 105 and the rear floor 106 of the upper body 100 due to the hydrogen tank 14 installed below the vehicle body.

A center floor side of the floor kick-up portion 107 is a portion which is coupled to the body mounting portion (217c in FIG. 1) of the chassis frame 200, and the body mounting portion 217c must exist at a corresponding location of the chassis frame 200 in order to couple the upper body 100 and the chassis frame 200.

In a fuel cell vehicle dedicated platform, the floor kick-up portion 107 of the upper body 100 is a portion on which passengers sit and below which the hydrogen tank 14 is located. The floor kick-up portion 107 is a very important portion to provide the passengers with ride comport and protect not only passengers but also the hydrogen tank 14 from a vehicle crash including side crash.

In case of gasoline and diesel vehicles, there is no possibility that a fuel tank is destroyed in a side crash. In case of the fuel cell vehicle having hydrogen tank, however, it is expected that the side crash badly affects the fuel cell system due to a layout of the fuel system and the size of the hydrogen tank.

Therefore, for fuel cell vehicles, there is a need for an improved vehicle body structure for protecting the fuel system from a side crash, which can minimize transformation of the vehicle body in the event of a vehicle crash and maximize protection of passengers and hydrogen tank.

Also, since the floor kick-up portion of the upper body is a location where the concentrated load is transferred from the body mounting portion of the chassis frame, there is a urgent need for a vehicle body structure for efficiently distributing or dispersing the concentrated load and preventing vibration and transformation due to the load.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to solve the aforementioned problems associated with prior arts and one object of the present invention is to provide an upper body structure for a fuel cell vehicle in which the concentrated load transferred from the floor kick-up portion of the upper body through the body mounting portion of the chassis frame and the side crash load caused by the side crash are efficiently dispersed.

Another object of the present invention is to provide an upper body structure for a fuel cell vehicle in which the floor kick-up portion of the upper body is reinforced, so that vibration and transformation of vehicle body are minimized, the ride comport is improved, and the protection effect of the passenger and the hydrogen tank is maximized.

In one aspect, the present invention provides an upper body structure for a fuel cell vehicle for reinforcing a floor kick-up portion connecting a center floor and a rear floor of the upper body, comprising: a center floor rear cross member (114) horizontally arranged in a lower portion of the floor kick-up portion and connecting side sills (111) arranged on both sides of the upper body; two rear floor front side members (123) arranged in an up-down direction on both sides of the upper body and having lower ends connected to both ends of the center floor rear cross member (114); and a rear floor front cross member (124) horizontally arranged in an upper portion of the floor kick-up portion and connecting upper ends of the two rear floor front side members (123), wherein the center floor rear cross member (114), the two rear floor front side members (123) and the rear floor front side member (124) form a first ring-type structure.

In a preferred embodiment, both ends of the rear floor front cross member (124) are connected to both side members (121) of a rear floor, and a rear floor center cross member (125) is arranged behind the rear floor front cross member (124) and horizontally connects the both side members (121) of the rear floor, so that the rear floor front cross member (124), the both side members (121) of the rear floor and the rear floor center cross member (125) form a second ring-type structure.

In the above embodiment, preferably, the both side members (121) of the rear floor are connected to rear ends of the side sills (111) at positions where the both side members (121) meet the rear floor center cross member (125), and the lower ends of the two rear floor front side members (123) coupled to both ends of the rear floor front cross member (124) are connected to the side sills (111), so that the side members (121) of the rear floor, the rear floor front side member (123) and the side sills (111) form a third ring-type structure, and the center floor rear cross member (114) of the first ring-type structure, the rear floor center cross member (125) of the second ring-type structure and the side sills (111) of the third ring-type structure form a fourth ring-type structure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

Other aspects of the invention are discussed infra.

BRIEF DESCRIPTION OF THE DRAWINGS

The above and other features of the present invention will be described in reference to certain exemplary embodiments thereof with reference to the attached drawings in which.

DETAILED DESCRIPTION

Figure 1:
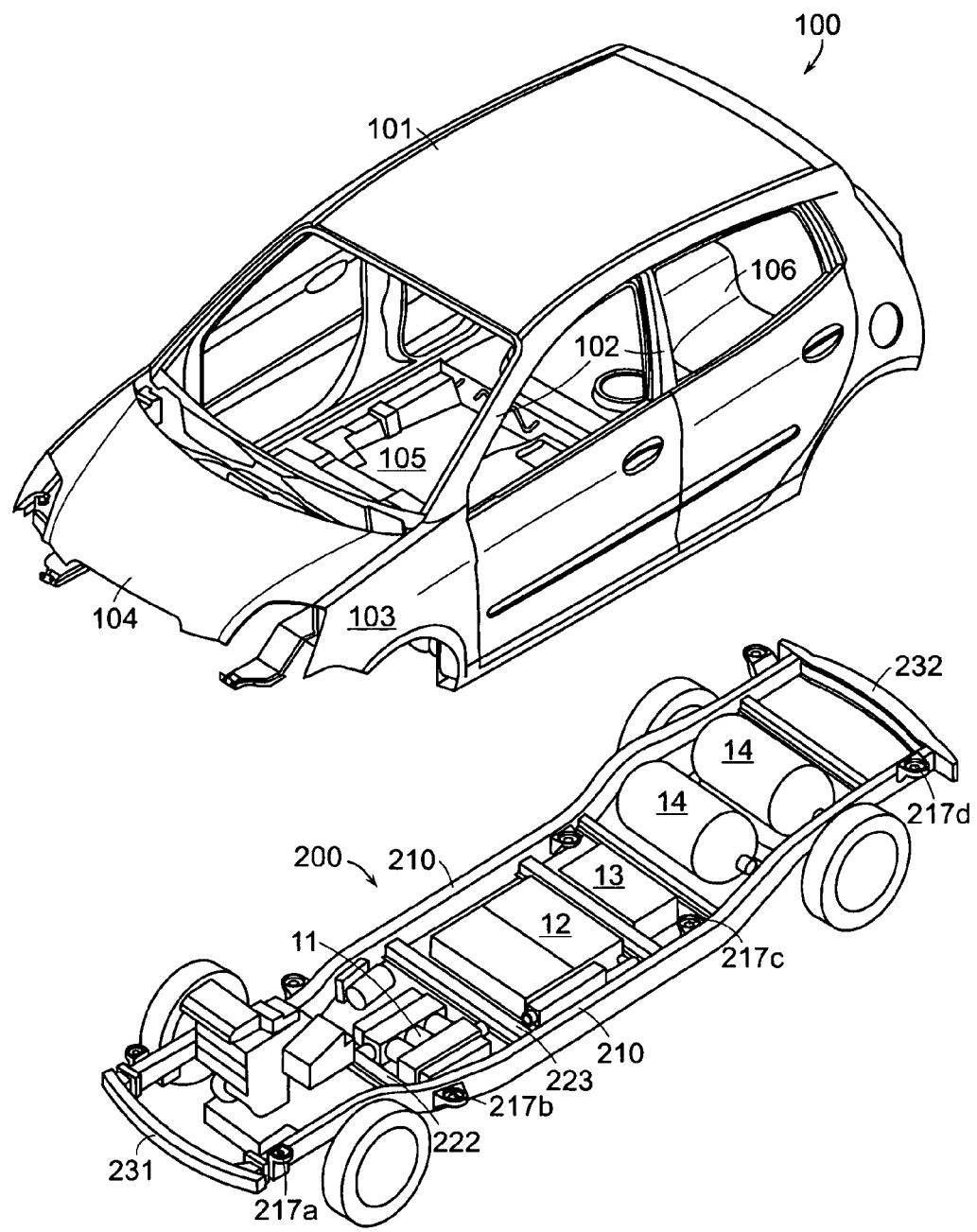
FIG. 1 is a perspective view illustrating a vehicle body structure of a fuel cell vehicle which comprises an upper body and a chassis frame according to a conventional art.
Figure 2:
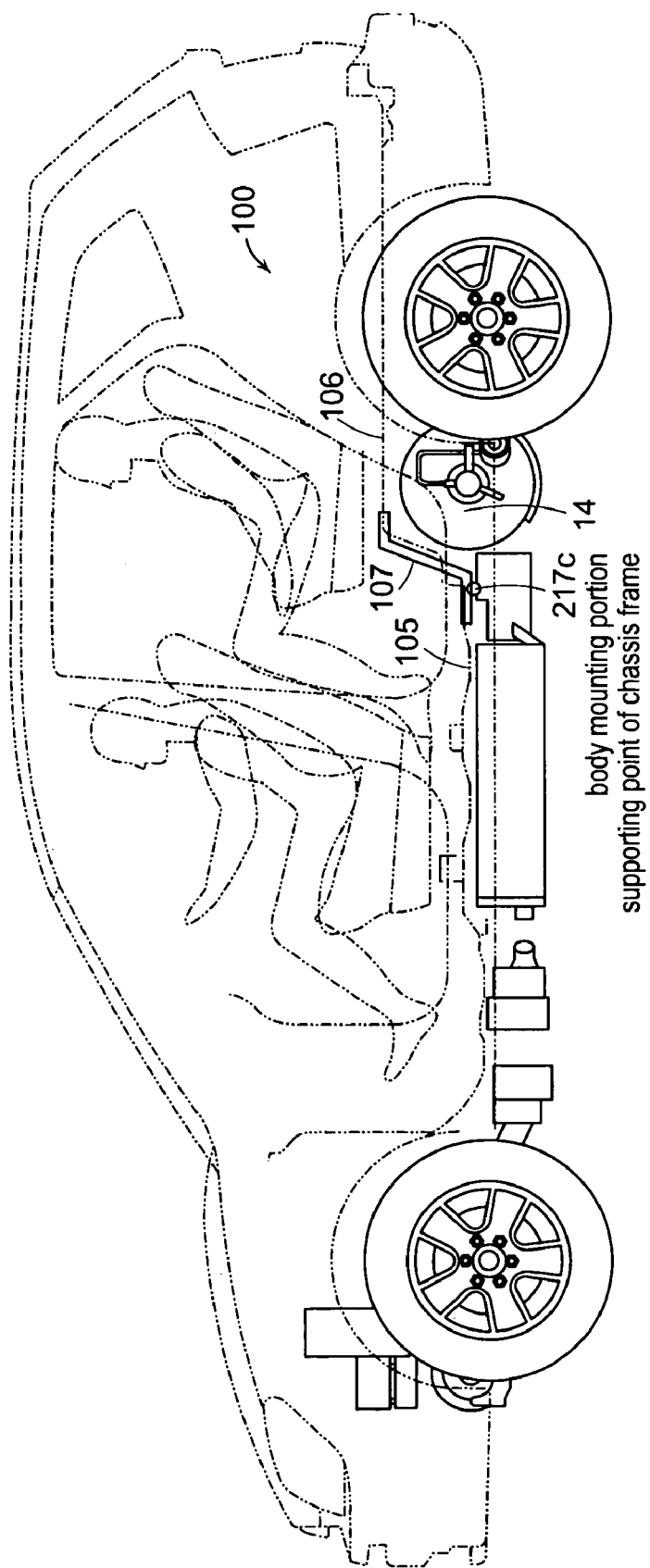
FIG. 2 is a side view illustrating a floor kick-up portion and a mounting location of a hydrogen tank in the vehicle body structure of the fuel cell vehicle according to the conventional art.

Reference will now be made in detail to the embodiments of the present invention, examples of which are illustrated in the accompanying drawings, wherein like reference numerals refer to the like elements throughout. The embodiments are described below in order to explain the present invention by referring to the figures.

The present invention relates to improvement of a member structure which constitutes the lower vehicle body of the upper body to reinforce the floor kick-up portion of the upper body in a vehicle body of a fuel cell vehicle.

Figure 3:
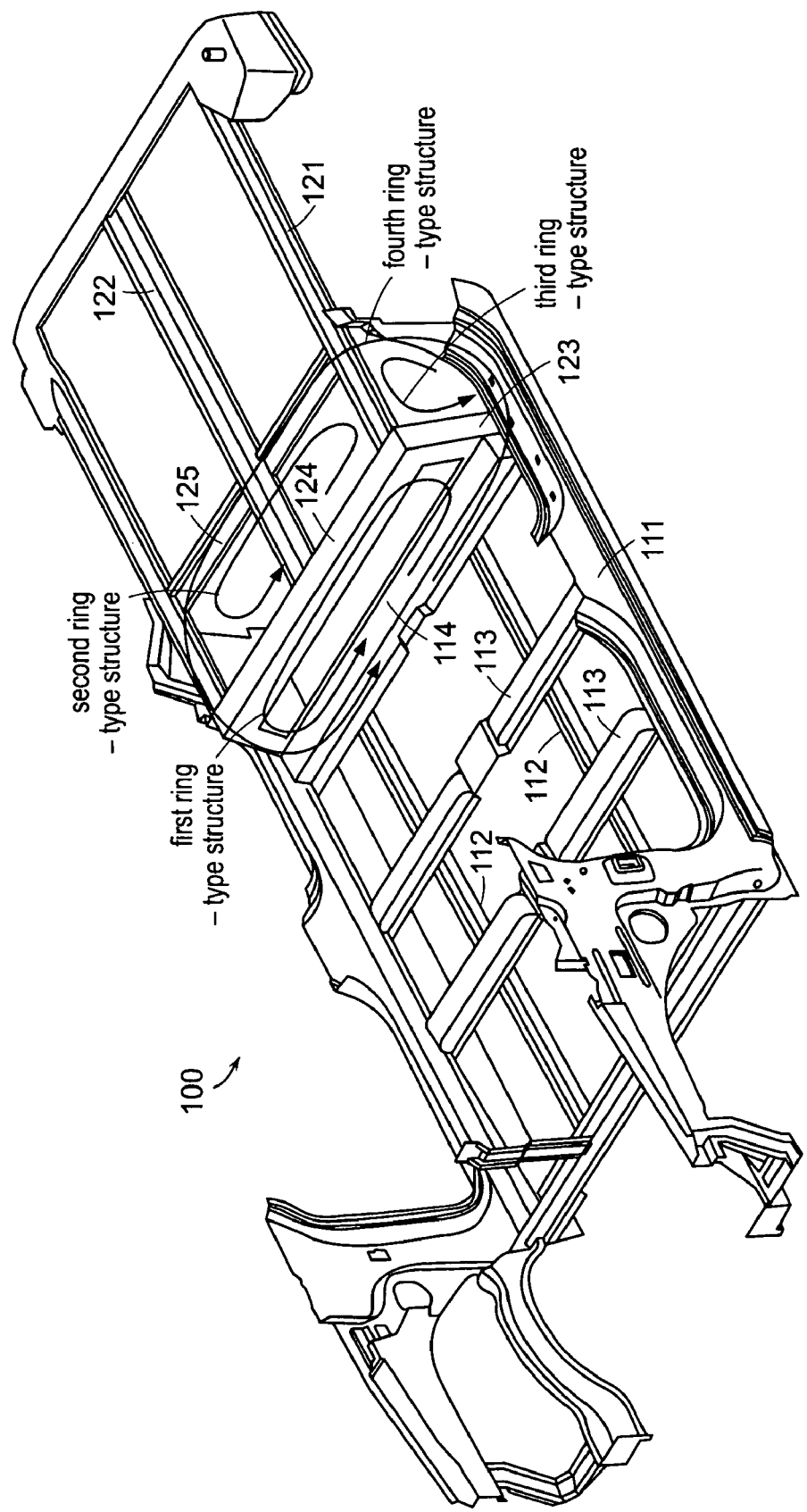
FIG. 3 is a perspective view illustrating a vehicle body structure of a fuel cell vehicle according to an exemplary embodiment of the present invention.

FIG. 3 is a perspective view illustrating a vehicle body structure of a fuel cell vehicle according to an exemplary embodiment of the present invention. Particularly, FIG. 3 shows the lower vehicle structure of the upper body.

As shown in FIG. 3, a lower portion of the upper body 100 comprises a plurality of members which are horizontally (transversely) or longitudinally arranged to be combined with each other.

Side sills 111 are lengthily arranged in a front-to-back direction of a vehicle body on both sides of the upper body 100.

In a center floor side, a plurality of members are longitudinally or horizontally arranged in a lattice form between the side sills 111 such that the longitudinal members 112 and the cross members 113 and 114 combined with each other.

In a rear floor side, side members 121 are arranged in a front-to-back direction on both sides of the upper body 100, and a longitudinal member 122 and cross members 124 and 125 are combined with each other between the both side members 121.

According to the present invention, members of the floor kick-up portion are arranged with a ring-type structure which is efficient to disperse a load in order to reinforce the floor kick-up portion of the upper body 100, which is described below in detail.

In the center floor side, the center floor rear cross member 114 is horizontally arranged in a lower portion of the floor kick-up portion such that both ends of the center floor rear cross member 114 are welded to an inner wall of the both side sills 111, respectively.

In the rear floor side, the rear floor front cross member 124 is horizontally arranged in an upper portion of the floor kick-up portion, and the rear floor front side members 123 are vertically arranged in an up-down direction on both sides of the upper body 100. At this time, both ends of the rear floor front cross member 124 are coupled to upper ends of the rear floor front side members 123.

Lower ends of the rear floor front side members 123 are coupled to both ends of the center floor rear cross member 114.

That is, both ends of the center floor rear cross member 114 and the rear floor front cross member 124 are connected by the rear floor front side members 123, forming a first ring-type structure on a vertical surface with respect to a longitudinal direction (i.e., front-to-back direction) of the vehicle body.

Both ends of the rear floor front cross member 124 are coupled to front ends of the both rear floor side members 121. Behind the rear floor front cross member 124, the rear floor center cross member 125 coupled to rear ends of the side sills 111 are connected between the both rear floor side members 121.

That is, both ends of the rear floor front cross member 124 and the rear floor center cross member 125 are connected by the both rear floor side members 121, forming a second ring-type structure on a vertical surface with respect to a vertical direction (bottom-to-top direction) of the vehicle body.

Lower ends of the both rear floor front side members 123 are coupled to the side sills 111, and the both rear floor side members 121 are coupled to rear ends of the side wills 111 at locations where they meet the end of the rear floor center cross member 125. That is, the rear floor side members 121, the both rear floor side members 123 and the side sills 111 form third ring-type structures on a vertical surface with respect to a right-left width direction of the vehicle body, in both sides of the upper body 100.

In the lower member structure of the upper body, since the first to third ring-type structures are connected to each other, the center floor rear cross member 114 of the first ring-type structure, the rear floor center cross member 125 of the second ring-type structure, and the side sills 111 of the third ring-type structure form a fourth ring-type structure.

Figure 4:
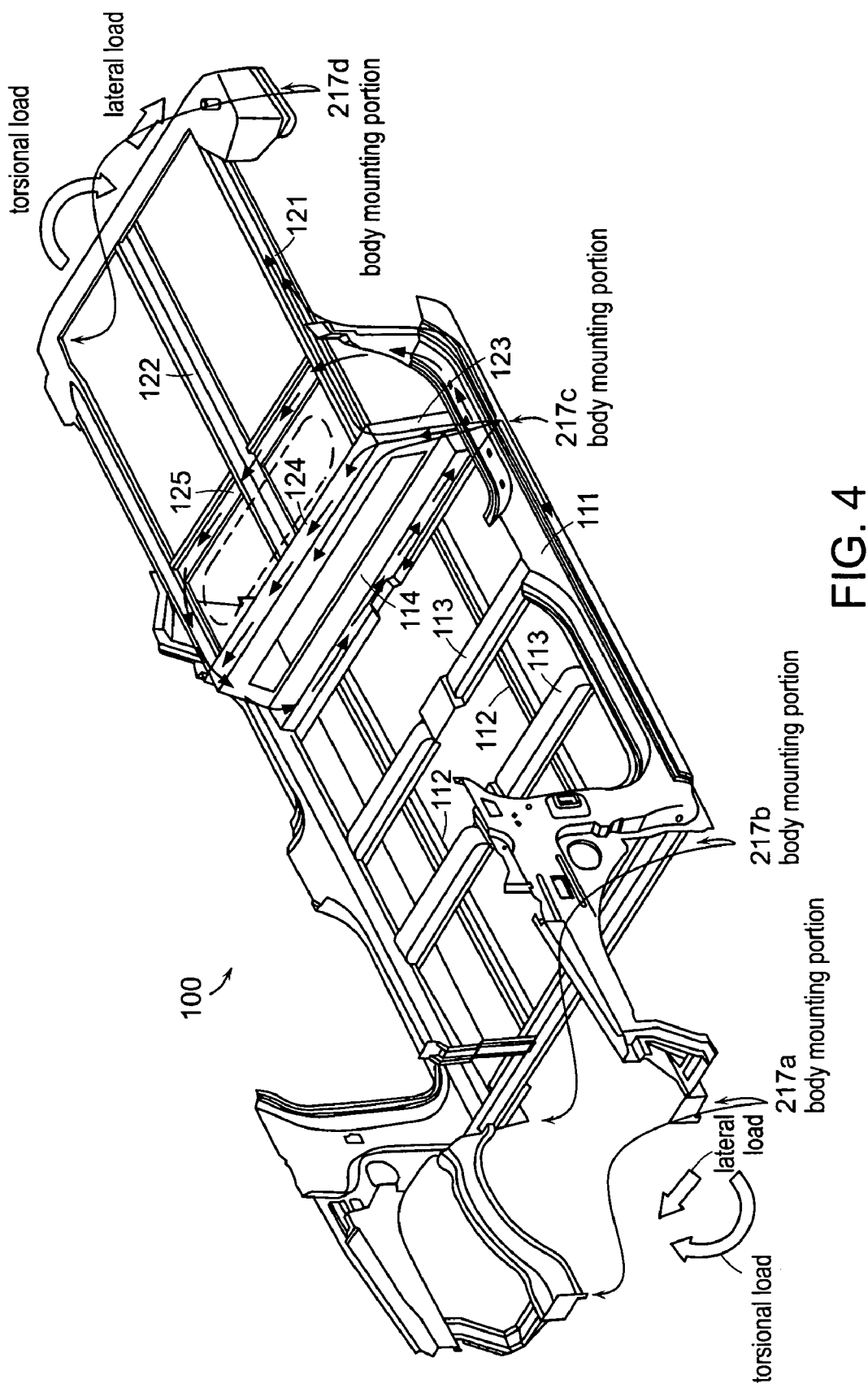
FIG. 4 is a perspective view illustrating a state that a concentrated load transferred through a body mounting portion is dispersed in the vehicle body structure of the fuel cell vehicle according to an exemplary embodiment of the present invention.
Figure 5:
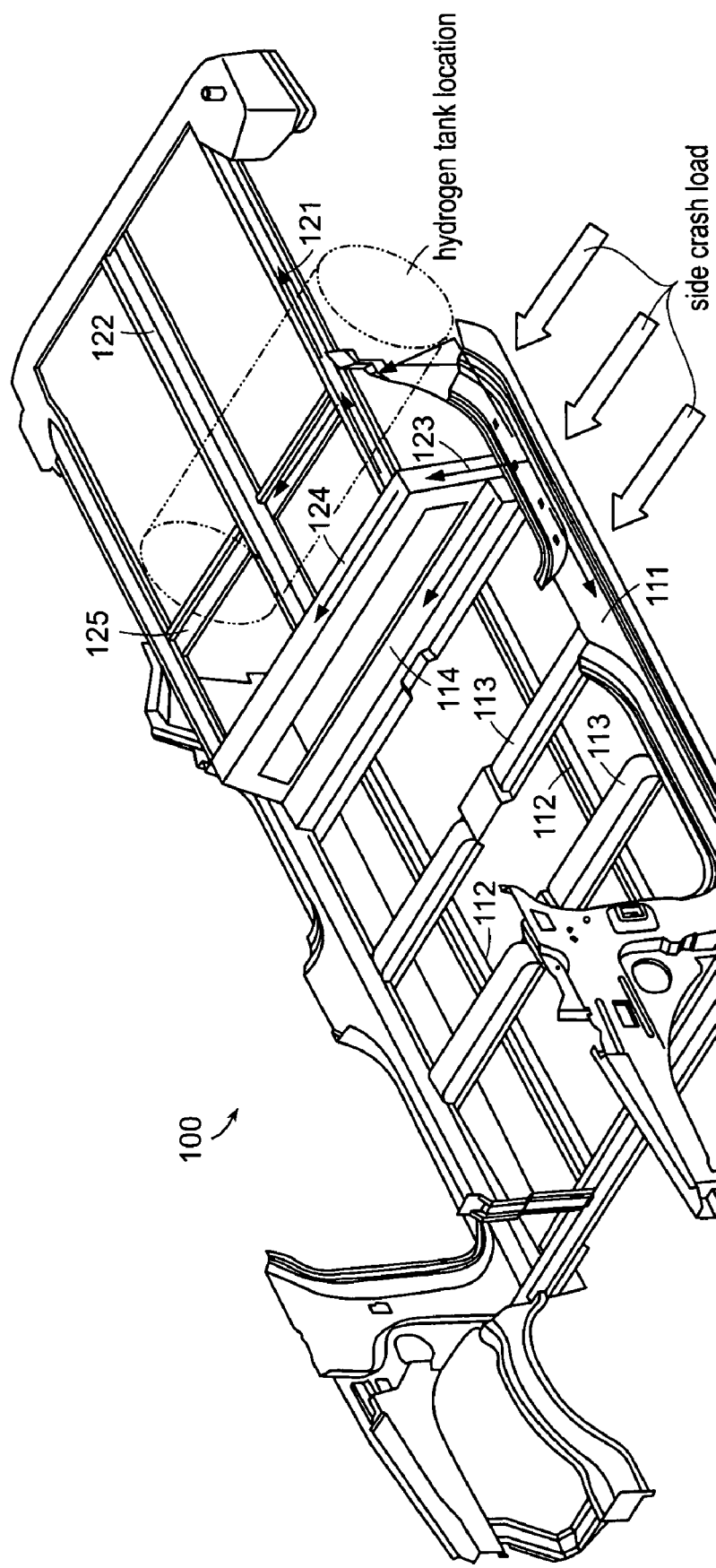
FIG. 5 is a perspective view illustrating a state that a side crash load is dispersed in the vehicle body structure of the fuel cell vehicle according to an exemplary embodiment of the present invention.

Referring to FIGS. 4 and 5, the mode of dispersing a load applied to a vehicle having a body structure according to the present invention is described.

The floor kick-up portion is a portion which greatly affects frame stiffness of a vehicle, and the ring-type structure(s) of the kick-up portion provides various load transferring paths and torsional stiffness with respect to torsion of a vehicle and a lateral load (particularly, cornering), as shown in FIG. 4.

Referring to FIG. 4, arrows denote paths that a concentrated load transferred via a body mounting portion of a lower chassis frame is transmitted along members which form a lower frame in the upper body. In the chassis frame, the body mounting portion located in the floor kick-up portion of the upper body 100 greatly affects the driving comport, and the concentrated load transferred to the side sill 111 of the upper body 100 through the body mounting portion is dispersed through various paths due to the ring-type structure(s), whereby transformation and vibration of a vehicle are prevented and the driving comport is improved.

As shown in FIG. 5, the ring-type vehicle body structure according to the present invention also provides multi-load paths with respect to a side crash load, and transformation of a vehicle body is reduced and a passenger and a hydrogen tank are efficiently protected in case of a side crash.

As described above, according to the upper body structure for the fuel cell vehicle of the present invention, the members arranged in the floor kick-up portion are arranged in the ring-type structure which efficiently disperses a load in order to reinforce the floor kick-up portion of the upper body. Therefore, the concentrated load transferred through the body mounting portion of the lower chassis frame and the side crash load transferred in case of a side crash are efficiently dispersed while reducing vibration and transformation of the vehicle body, improving the driving comport and protecting a passenger and a hydrogen tank.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. An upper body structure for a fuel cell vehicle for reinforcing a floor kick-up portion connecting a center floor and a rear floor of the upper body, comprising:
   a center floor rear cross member horizontally arranged in a lower portion of the floor kick-up portion and connecting side sills arranged on both sides of the upper body;
   two rear floor front side members arranged in an up-down direction on both sides of the upper body and having lower ends connected to both ends of the center floor rear cross member; and
   a rear floor front cross member horizontally arranged in an upper portion of the floor kick-up portion and connecting upper ends of the two rear floor front side members,
   wherein the center floor rear cross member, the two rear floor front side members and the rear floor front side member form a first ring-type structure,
   both ends of the rear floor front cross member are connected to both side members of a rear floor, and a rear floor center cross member is arranged behind the rear floor front cross member and horizontally connects the both side members of the rear floor, so that the rear floor front cross member, the both side members of the rear floor and the rear floor center cross member form a second ring-type structure, and the both side members of the rear floor are connected to rear ends of the side sills at positions where the both side members meet the rear floor center cross member, and the lower ends of the two rear floor front side members coupled to both ends of the rear floor front cross member are connected to the side sills, so that the side members of the rear floor, the rear floor front side member and the side sills form a third ring-type structure, and the center floor rear cross member of the first ring-type structure, the rear floor center cross member of the second ring-type structure and the side sills of the third ring-type structure form a fourth ring-type structure.

* * * * *